United States Patent [19]
Kim et al.

[11] Patent Number: 5,532,197
[45] Date of Patent: Jul. 2, 1996

[54] DIELECTRIC MATERIAL FOR HIGH FREQUENCIES

[75] Inventors: Kyung Yong Kim, Seoul; Wang Sup Kim, Suwon; Jung Rak Yun, Cheonan; Kwang Ho Chang, Seoul, all of Rep. of Korea

[73] Assignee: Korea Institute of Science and Technology, Seoul, Rep. of Korea

[21] Appl. No.: 459,543

[22] Filed: Jun. 2, 1995

[30] Foreign Application Priority Data

Jul. 27, 1994 [KR] Rep. of Korea .................. 18288/1994

[51] Int. Cl.$^6$ ..................................... C04B 35/46
[52] U.S. Cl. ........................ 501/136; 501/138; 501/139
[58] Field of Search .................................. 501/136, 138, 501/139

[56] References Cited

U.S. PATENT DOCUMENTS

| | | | |
|---|---|---|---|
| 4,781,859 | 11/1988 | Noi | 501/139 |
| 5,155,072 | 10/1992 | Bruno et al. | 501/139 |
| 5,453,409 | 9/1995 | Kishi et al. | 501/139 |

OTHER PUBLICATIONS

Jenn–Ming Wu et al.; "Reaction Sequence and Effects of Calcination and Sintering on Microwave Properties of (Ba, Sr)O–Sm$_2$O$_3$–TiO$_2$ Ceramics"; *Journal of American Ceramic Society;* vol. 73 No. 6; pp. 1599–1605; (1990). No Month.

K. Wakino et al.; "Microwave Characteristics of (Zr, Sn)TiO$_4$ and BaO–PbO–Nd$_2$O$_3$–TiO$_2$ Dielectric Resonators"; *Journal of American Ceramic Society;* vol. 67 No. 4; pp. 278–287; (1984). No Month.

Junichi Kato; "Material Produces Small Resonators With High Dielectric Constant"; *JEE;* Sep.; pp. 114–118; (Sep. 1991).

K. Matsumoto et al.; "Ba(Mg$_{1/3}$Ta$_{2/3}$)O$_3$ Ceramics with Ultra–low Loss at Microwave Frequencies" *In Proce. of the Sixth IEEE International Symposium on Applications of Ferroelectrics;* pp. 118–121; (1986) No Month.

S. Nishigaki et al.; "BaO–TiO$_2$–WO$_3$ Microwave Ceramics and Crystalline BaWO$_4$" *J. Am. Ceram. Soc.;* vol. 71 No. 1 C–11–C–17; (1988). No Month.

Y. Kobayashi et al.,; "Resonant Modes of a Dielectric Rod Resonator Short–Circuited at Both Ends by Parallel Conducting Plates" *IEEE Transactions on Microwave Theory and Techniques;* vol. MTT–28 No. 10; pp. 1077–1085; (Oct. 1980).

B. W. Hakki et al.; "A Dielectric Resonator Method of Measuring Inductive Capacities in the Millimeter Range" *IRE Transactions on Microwave Theory and Techniques;* pp. 402–410; (Feb. 1960).

*Primary Examiner*—Deborah Jones
*Attorney, Agent, or Firm*—Scully, Scott, Murphy & Presser

[57] ABSTRACT

There is disclosed a dielectric material for high frequencies comprising a composition system represented by the following formula:

$$x(Li_{1/2}Nd_{1/2})TiO_3 - yCaTiO_3 - zBa(Zn_{1/3}Nb_{2/3})O_3$$

wherein
$0.60 \leq x \leq 0.8$
$0.04 \leq y \leq 0.38$ and
$0.02 \leq z \leq 0.16$.

3 Claims, 1 Drawing Sheet

DIELECTRIC MATERIAL FOR HIGH FREQUENCIES

BACKGROUND OF THE INVENTION

1. Field of the invention

The present invention relates, in general, to a dielectric material for high frequencies and, more particularly, to a dielectric material for high frequencies which possesses high quality factor Q and exhibits superior temperature coefficient of resonant frequency even in high frequency regions.

2. Description of the Prior Art

In recent years, there have been rapidly developed communication systems using microwaves (frequency band ranging from 300 MHz to 300 GHz), such as wireless telephones, car phones, cellular phones, satellite broadcasting systems, and the like, and there is an increasing demand the dielectric ceramics with better electrical properties, which are extensively used in resonator devices, band pass filters, microwave integrated circuits and other parts of communication systems.

For application for communication systems using microwaves, a dielectric material for high frequencies needs to satisfy the following conditions:

1. A large dielectric constant for the miniaturization of parts of communication systems because the wave length of the microwaves in a dielectric material is inversely proportional to the square root of the dielectric constant;
2. A high Q value (reciprocal of dielectric loss) for high performance because dielectric loss is proportional to frequency;
3. A small temperature coefficient of resonant frequency, so as to obtain desired resonant characteristics which are stable to temperature change.

In addition, it is required that the dielectric material for high frequencies is resistant to ageing, large in thermal conductivity and high in mechanical strength.

Well known representative dielectric materials for high frequencies will be exemplified.

On the one hand, the following are known as dielectric materials which are low in dielectric loss but have a dielectric constant of not more than 40:

i. A $Ba(M^{+2}_{1/3}M^{+5}_{2/3})O_3$ system wherein $M^{+2}$=Mg or Zn, $M^{+5}$=Ta or Nb [reference: K. Matsumoto, T. Hiuga, K. Takada and H. Ichimura, "$Ba(Mg_{1/3}Ta_{2/3})O_3$ Ceramics with Ultra-low Loss at Microwave Frequencies" In Proce. of the Sixth IEEE International Symposium on Applications of Ferroelectrics, pp. 118~121, (1986)].

ii. A $Ba_2Ti_9O_{20}$ system [reference: S. Nisikaki et al., "BaO—$TiO_2$—$WO_3$ Microwave Ceramics and Crystalline $BaWO_4$" J. Am. Ceram. Soc., 71(1), C-11-C-17 (1988)].

iii. A $(Zr,Sn)TiO_4$ system [reference: K. Wakino et al., "Microwave Characteristics of (Zr, Sn)$TiO_4$ and BaO—PbO—$Nd_2O_3$—$TiO_2$ Dielectric Resonators" J. Am. Ceram. Soc. 67(4), 278~281 (1983)].

On the other hand, the following are known as dielectric materials which have a dielectric constant of not less than 80 yet are relatively high in dielectric loss (Q×fo (GHz)<10,000):

i. A BaO—$Sm_2O_3$—$TiO_2$ system [reference: J. M. Wu and M. C. Chang, "Reaction Sequence and Effects of Calcination and Sintering on Microwave Properties of (Ba, Sr)O—$Sm_2O_3$—$TiO_2$ Ceramics" J. Am. Ceram. Soc., 73(6), 1599~1605 (1990)].

ii. A (Ba,Pb)O—$Nd_2O_3$—$TiO_2$ system [reference: K. Wakino et al., "Microwave Characteristics of (Zr,Sn)$TiO_4$ and BaO—PbO—$Nd_2O_3$—$TiO_2$ Dielectric Resonators" J. Am. Ceram. Soc. 67(4), 278~281 (1983)].

iii. A (Pb,Ca)$ZrO_3$ system [reference: J. Kato, "Material Produces Small Resonators with High Dielectric Constant" JEE, Sep., 114~118 (1991)].

Dielectric ceramics for high frequencies having high dielectric constants are suitable as materials for microwave devices using electric waves of long wavelength and are in great demand in devices for communication systems requiring miniaturization.

However, it is very difficult to develop dielectric materials having stable temperature coefficients of resonant frequency as well as high dielectric constants and high Q values. Generally, dielectric losses and temperature coefficients of resonant frequency in dielectric materials having large dielectric constants, both increase because of dipole coupling therein. That is to say, since materials with high dielectric constants are inclined to have low Q values and large temperature coefficients of resonant frequency, it is very difficult to satisfy the three desired electrical properties in a single material system.

For application in communication systems, however, dielectric materials for high frequencies, first of all, must have stable temperature coefficients of resonant frequency.

Of the known conventional dielectric compositions, in fact, a material satisfying the three desired electrical properties at same time has not been found. For example, a $SrTiO_3$ system exhibits satisfactory dielectric constant and quality factor (Q×fo) which are in a range of 110 to 151 and 8,900 to 36,000 GHz, respectively but is problematic in that the temperature coefficient of resonant frequency is too large, ranging from 505 to 7,500 ppm/° C. On the other hand, a $(Li_{1/2}Nd_{1/2})TiO_3$ system exhibits a low dielectric constant of about 75, and a temperature coefficient of resonant frequency of about −274 ppm/° C. yet a small dielectric loss.

SUMMARY OF THE INVENTION

Therefore, an object of the present invention is to make the best of the $(Li_{1/2}Nd_{1/2})TiO_3$, $CaTiO_3$ and $Ba(Zn_{1/3}Nb_{2/3})O_3$ substances as well as to overcome the above problems encountered in prior arts and to provide a novel dielectric material, capable of exhibiting a dielectric constant of not less than 80 yet a small dielectric loss and easily controlling a temperature coefficient of resonant frequency into positive and negative values according to demand.

Based on the intensive and thorough study by the present inventors, the above object could be accomplished by a provision of a dielectric material for high frequencies comprising a composition system represented by the following formula:

$$x(Li_{1/2}Nd_{1/2})TiO_3\text{—}yCaTiO_3\text{—}zBa(Zn_{1/3}Nb_{2/3})O_3$$

wherein $0.60 \leq X \leq 0.8$ $0.04 \leq Y \leq 0.38$ and $0.02 \leq Z \leq 0.16$.

BRIEF DESCRIPTION OF THE DRAWING

The above objects and other advantages of the present invention will become more apparent by describing in detail the preferred embodiment of the present invention with reference to the attached drawings in which.

DETAILED DESCRIPTION OF THE INVENTION

Figure 1:
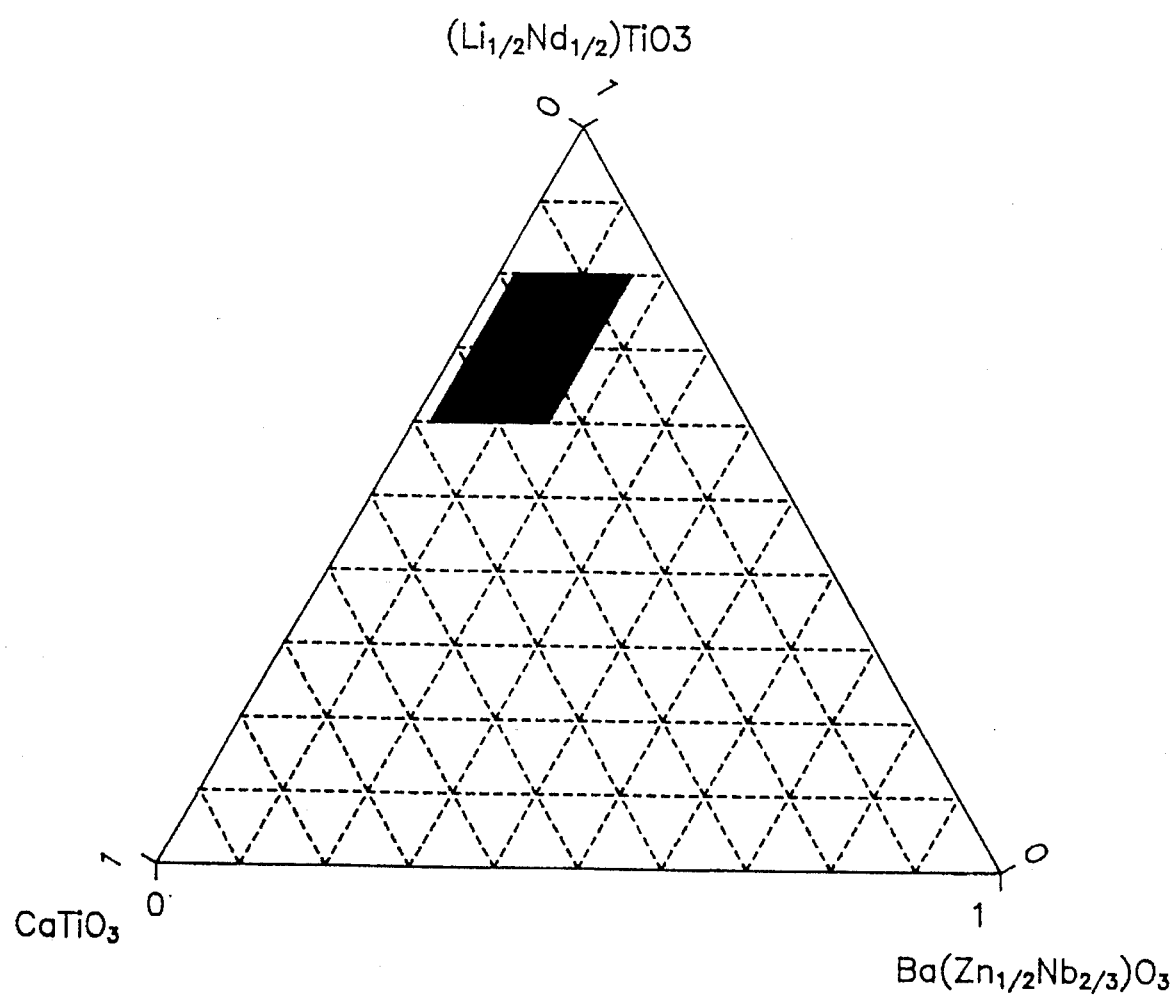
FIG. 1 is a ternary phase diagram showing a composition range for $(Li_{1/2}Nd_{1/2})TiO_3$—$CaTiO_3$—$Ba(Zn_{1/3}Nb_{2/3})O_3$ system, according to the present invention.

The present invention provides a dielectric material comprising a composition system which comprises $(Li_{1/2}Nd_{1/2})TiO_3$, $CaTiO_3$ and $Ba(Zn_{1/3}Nb_{2/3})O_3$ with the amounts of the components being in the ranges shown in FIG. 1.

Accordingly, the dielectric material for high frequencies is prepared with a composition comprising about 0.6 to about 0.9 mole fraction of $(Li_{1/2}Nd_{1/2})TiO_3$, about 0.09 to about 0.28 mole fraction of $CaTiO_3$, and about 0.02 to about 0.16 mole fraction of $Ba(Zn_{1/3}Nb_{2/3})O_3$.

The presence of three components $(Li_{1/2}Nd_{1/2})TiO_3$, $CaTiO_3$ and $Ba(Zn_{1/3}Nb_{2/3})O_3$ allows dielectric materials to be superior in the dielectric properties including dielectric constant, dielectric loss and temperature coefficient of resonant frequency. Especially, the amount of $(Li_{1/2}Nd_{1/2})TiO_3$ has an important influence on the dielectric properties. When $(Li_{1/2}Nd_{1/2})TiO_3$ is contained in an amount of around 0.7 mole fraction, excellent dielectric material is prepared with a dielectric constant of 90 to 102.5 and a temperature coefficient of resonant frequency of not more than 10 ppm/° C. In addition, the value of the temperature coefficient of resonant frequency in the dielectric material can be easily either positive or negative by controlling small amount of $(Li_{1/2}Nd_{1/2})TiO_3$, according to the present invention.

The preferred embodiments of the present invention will now be further described with reference to specific examples.

Other features, advantages and embodiments of the invention disclosed herein will be readily apparent to those exercising ordinary skill after reading the foregoing disclosures.

EXAMPLE

Powdery $Li_2CO_3$, $Nd_2O_3$, $CaCO_3$, $TiO_2$, ZnO, $Nb_2O_5$ and $BaCO_3$, all having a purity of above 99%, were so weighed in a balance as to give compositions shown in the following Table 1 and mixed. The powder mixtures were calcined at 1,050° C. for 4 hours in air, to give three systems $(Li_{1/2}Nd_{1/2})TiO_3$, $CaTiO_3$, and $Ba(Zn_{1/3}Nb_{2/3})O_3$ which were then pulverized and calcined at a temperature of 1,200° to 1,300° C. for 4 hours, again, to produce perovskite type solid solutions.

Following pulverization, each of the solid solutions was molded under pressure into a disk type specimen with a diameter of 10 mm and a thickness of 4 to 5 mm which was subsequently sintered at a temperature of 1,400° to 1,500° C. for a period of 2 to 12 hours in air. The sintering temperature was raised as the content of $Ba(Zn_{1/3}Nb_{2/3})O_3$ was increased. After the sintering, the specimens exhibited contraction rates ranging from 12 to 20%.

Opposite faces of the specimens were well polished with an abrasive paper (up to #3000) and then, they were tested by a Hakki-Coleman method for dielectric constant, Q value and temperature coefficient of resonant frequency at a frequency of 2 to 4 GHz and at a temperature of 20° to 30° C. The results are given as shown in the following Table 1.

TABLE 1

Dielectric Properties of  $X(Li_{1/2}Nd_{1/2})TiO_3$—$YCaTiO_3$—$ZBa(Zn_{1/3}Nb_{2/3})O_3$ system

| Specimen No. | Composition | | | Dielectric Const. ($\epsilon_r$) | Q × fo (GHz) | TCF (ppm/°C.) |
|---|---|---|---|---|---|---|
| | X | Y | Z | | | |
| 1 | 0 | 0 | 0 | 40 | 5600 | 28 |
| 2 | 0 | 1 | 1 | 170 | 6200 | 756 |
| 3 | 1 | 0 | 0 | 75 | 1800 | −274 |
| 4 | 0 | 0.9 | 0.1 | 151.3 | 8900 | 750 |
| 5 | 0 | 0.8 | 0.2 | 138.5 | 12000 | 655 |
| 6 | 0 | 0.7 | 0.3 | 125 | 29000 | 580 |
| 7 | 0 | 0.6 | 0.4 | 110.5 | 36000 | 505 |
| 8 | 0.9 | 0.09 | 0.01 | 82.5 | 2500 | −150 |
| 9 | 0.8 | 0.18 | 0.02 | 92.1 | 3500 | −80 |
| 10 | 0.7 | 0.27 | 0.03 | 102.5 | 4300 | 10 |
| 11 | 0.6 | 0.36 | 0.04 | 106.6 | 5900 | 112 |
| 12 | 0.9 | 0.08 | 0.02 | 82.6 | 3020 | −178 |
| 13 | 0.8 | 0.16 | 0.04 | 90.2 | 4100 | −83.8 |
| 14 | 0.7 | 0.24 | 0.06 | 97.8 | 4900 | 8 |
| 15 | 0.6 | 0.32 | 0.08 | 105.4 | 6200 | 106.4 |
| 16 | 0.9 | 0.07 | 0.03 | 81.3 | 3150 | −190 |
| 17 | 0.8 | 0.14 | 0.06 | 87.6 | 4750 | −90 |
| 18 | 0.7 | 0.21 | 0.09 | 93.9 | 5600 | 5 |
| 19 | 0.6 | 0.28 | 0.12 | 101.4 | 6900 | 98 |
| 20 | 0.9 | 0.06 | 0.04 | 80 | 5500 | −195 |
| 21 | 0.8 | 0.12 | 0.08 | 85.5 | 5900 | −100 |
| 22 | 0.7 | 0.18 | 0.12 | 90.5 | 6900 | 3 |
| 23 | 0.6 | 0.24 | 0.16 | 95.5 | 9500 | 105 |

What is claimed is:

1. A dielectric material for high frequencies comprising a composition system represented by the following formula:

$$x(Li_{1/2}Nd_{1/2})TiO_3 - yCaTiO_3 - zBa(Zn_{1/3}Nb_{2/3})O_3$$

wherein $0.60 \leq x \leq 0.8$ $0.04 \leq y \leq 0.38$ and $0.02 \leq z \leq 0.16$.

2. The material according to claim 1, wherein said X is 0.7.

3. The material according to claim 1, wherein said dielectric material exhibit a dielectric constant of not less than 80.

* * * * *